June 25, 1929.                B. W. ST. CLAIR                1,718,497
                              TELEMETRIC SYSTEM
                              Filed June 20, 1924
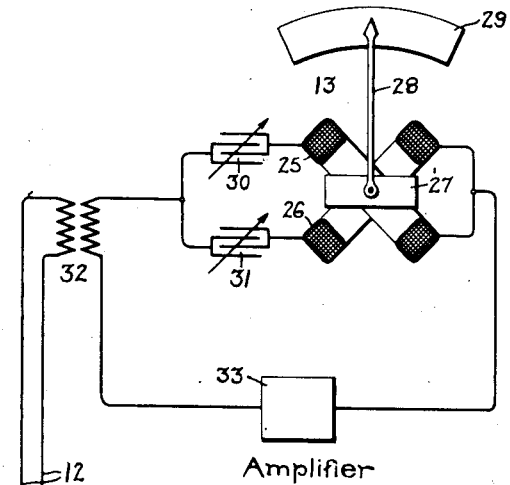
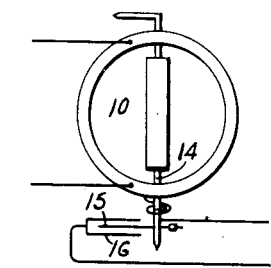
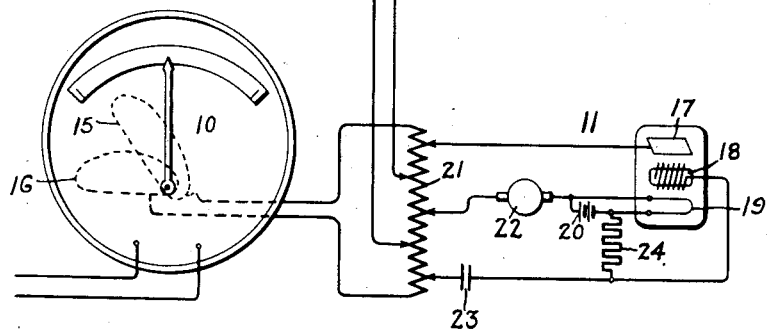
Inventor:
Byron W. St.Clair;
by Alexander S. ____
His Attorney.

Patented June 25, 1929.

1,718,497

UNITED STATES PATENT OFFICE.

BYRON W. ST. CLAIR, OF LYNN, MASSACHUSETTS, ASSIGNOR TO GENERAL ELECTRIC COMPANY, A CORPORATION OF NEW YORK.

TELEMETRIC SYSTEM.

Application filed June 20, 1924. Serial No. 721,341.

My invention relates to a method and means for electrically transmitting to and indicating the reading of an instrument or other device at a distant point. The objects of my invention are to provide such a system requiring only a single circuit between the transmitting and receiving stations, a system which is independent of the length and resistance of the transmitting circuit and a system which does not require any appreciable torque from the transmitting instrument for its operation.

In carrying my invention into effect, I make use of a suitable oscillating generator, preferably of the vacuum tube type, for supplying the transmitting circuit with an alternating current. I associate with the circuit of this generator a variable device, such as a condenser, or a reactance which changes the constants of the generator circuit in such a way as to vary the generated frequency. This device is varied in accordance with the indications of the transmitting instrument. Then I provide a frequency responsive receiving instrument at the distant station calibrated with the system so as to reproduce the indications of the transmitting instrument.

The features of my invention which are believed to be novel and patentable will be pointed out in the claim appended hereto. For a better understanding of my invention, reference is made in the following description to the accompanying drawing wherein Fig. 1 represents one embodiment of my invention showing a complete system and the circuit connections therefor; and Fig. 2 is a diagrammatic representation of the transmitting instrument taken at right angles to the instrument as shown in Fig. 1 to more clearly show the arrangement of the variable condenser.

In Fig. 1, 10 indicates the transmitting instrument; 11, the oscillating generator; 12, the transmitting lines; and 13 the receiving instrument.

The transmitting instrument is here represented as an indicating type electric measuring instrument such as a voltmeter although it could be any other movable device, the position or indication of which it is desired to indicate at a distant point. On the shaft 14 of the instrument is one plate 15 of a variable condenser (see Fig. 2). The stationary plate of the condenser is indicated at 16. The variable condenser may be placed below the coils of the instrument and requires but a small space as shown in Fig. 2. It will be evident that as the instrument deflection increases, the movable plate will be displaced with respect to the stationary plate and the capacity will be decreased. As represented, the condenser will have a maximum capacity when the instrument deflection is zero, and a minimum capacity when the instrument deflection is a maximum, however, I do not wish to be limited to this arrangement. It will also be evident that the extra torque necessary for the movement of the condenser plate 15 will be very small and ordinarily will not interfere with the accuracy of the instrument.

There is a small instrument torque necessary to separate the condenser plates due to the mutual attraction between them. However, if this is sufficient to change the calibration of the instrument, it can be taken care of in a very simple and accurate manner by readjusting the setting of the usual control spring which is provided to oppose the instrument deflection. The counter torque of the control spring and the counter torque of the condenser plate are in the same direction when the condenser plates have their maximum capacity relation at zero deflection as illustrated. Consequenly, I prefer this or an equivalent arrangement where the instrument 10 is of the usual type, because by such arrangement, the extra torque imposed by the mutual attraction of the condenser plates can then be accurately and simply compensated for, if that is necessary, by a slight alteration of the setting of the control spring. As an alternative, the scale of the instrument could be calibrated with the variable condenser in operative condition.

The oscillator 11 and its associated circuit is one of a number of standard hook-ups and comprises the vacuum tube containing the plate 17, the grid 18 and the filament 19, a battery 20 for heating the filament, an inductance coil 21, and a source of direct current potential 22 connected between the filament and an intermediate point on the inductance coil. The grid 18 and the plate 17 are connected adjacent the opposite ends of the inductance coil. The condenser 23 connected in the grid circuit and the resistance 24 connected between the filament and the grid outside the tube are arranged in the usual way. It is known that such a device may be used as a generator of alternating currents and that if the constants of its circuit are varied, that the frequency which it generates will vary. Thus, the variable condenser 15, 16 is connected across the terminals of the coil 21 and by varying the capacity in this circuit, the frequency of the alternating current produced by the device will vary. According to the hook-up illustrated, a decrease in the capacity will cause the generated frequency to increase. There are a number of other hook-ups which will produce the equivalent result and I do not wish to be limited to the particular arrangement illustrated. The outgoing transmitting circuit 12 is supplied by this oscillator, the circuit being connected across the central portion of the coil 21 and it will be evident that an alternating current having a frequency dependent upon the indication of instrument 10 will be fed to circuit 12.

The frequency responsive instrument 13 is of a well known type. Such an instrument is described in United States Patent 1,076,448 to Pratt, dated October 21, 1913. It comprises a pair of stationary coils 25 and 26 arranged at right angles to each other and a moving magnetic vane 27 having a low hysteresis loss provided with a pointer 28 which cooperates with a scale 29. Coils 25 and 26 are connected in parallel with each other and in series with these coils are devices, represented as condensers 30 and 31, for tuning these circuits to different frequencies. This parallel circuit is supplied from the circuit 12 preferably through an air core transformer 32. It will generally be desirable to have an amplifier designated at 33 in the circuit of the receiving instrument to amplify the alternating currents received, particularly if the transmitting distance is at all great.

Assuming for the purpose of illustration that the frequency supplied to circuit 12 at the transmitting station varies from 600 cycles, when the instrument 10 indicates zero, to 700 cycles for full scale deflection, the circuit coil 25 and condenser 30 will be tuned for approximately 600 cycles, preferably a little less than 600 cycles, and the circuit of coil 26 and condenser 31 will be tuned for approximately 700 cycles, preferably a little more than 700 cycles. Then, at 600 cycles, corresponding to zero deflection of instrument 10, coil 25 will predominate and the iron core vane 27 will assume a position at approximately right angles to this coil and the pointer 28 will indicate zero on scale 29. At 700 cycles corresponding to full scale deflection of instrument 10, coil 26 will predominate and very little current will flow in coil 25. This will cause vane 27 to assume a position at substantially right angles to coil 26 so as to place itself in alinement with the flux set up by this coil and the pointer 28 will give a full scale indication. At intermediate frequencies, current will flow through both coils, the division of current being proportional to the frequency. Thus at 650 cycles, both coils will carry substantially equal currents and vane 27 will take an intermediate position corresponding to ½ full scale deflection on scale 29 which will correspond to the deflection then existing at instrument 10.

The scale of instrument 29 will be calibrated with scale 10 and preferably in the same units. The shape of condenser plates 15 and 16 will be chosen such that the variation in frequency produced will be proportional to the deflection. The value and range of frequency to be used in any particular case will depend upon the transmitting distance, the type of oscillator available and the particular hook-up which is selected. In general, it is desirable to have the frequency as high as other considerations will permit since then the size of the variable condenser associated with instrument 10 may be decreased proportionally. After the circuits of the oscillator and the receiving instrument are once adjusted to the correct conditions, they will remain fixed and the only thing to be varied is the condenser associated with the transmitting instrument.

It will thus be seen that I have provided a reliable telemetric system which involves no moving contacts, requires but a single transmitting circuit which need not be of constant resistance and consequently is independent of temperature changes, and one which does not interfere with the accuracy of a delicate measuring instrument used as a transmitter.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:

A telemetric system comprising an indicating instrument employed as a transmitter, a variable condenser which is varied in response to changes in the indications of said instrument, a vacuum tube oscillator for producing alternating currents, said condenser being associated with said oscillator in such a way as to vary the frequency of the alternating currents produced thereby in response to changes in the indication of said instrument, and a frequency meter supplied by said oscillator at a distant point for measuring said frequency, said meter having a frequency responsive movable indicator and a scale cooperating therewith calibrated to give indications corresponding to the indications of said first mentioned indicating instrument.

In witness whereof, I have hereunto set my hand this 17th day of June, 1924.

BYRON W. ST. CLAIR.